(12) United States Patent
Childress

(10) Patent No.: US 11,377,572 B2
(45) Date of Patent: Jul. 5, 2022

(54) BLENDING COAT FOR PAINT AND METHOD OF APPLICATION

(71) Applicant: David Childress, Atoka, TN (US)

(72) Inventor: David Childress, Atoka, TN (US)

( * ) Notice: Subject to any disclaimer, the term of this patent is extended or adjusted under 35 U.S.C. 154(b) by 455 days.

(21) Appl. No.: 16/504,386

(22) Filed: Jul. 8, 2019

(65) Prior Publication Data

US 2021/0009847 A1   Jan. 14, 2021

(51) Int. Cl.
*C09D 175/04* (2006.01)
*C09D 167/02* (2006.01)
*C08K 5/07* (2006.01)
*C09D 101/02* (2006.01)
*C09D 133/08* (2006.01)

(52) U.S. Cl.
CPC .............. *C09D 175/04* (2013.01); *C08K 5/07* (2013.01); *C09D 101/02* (2013.01); *C09D 133/08* (2013.01); *C09D 167/02* (2013.01)

(58) Field of Classification Search
CPC .. C09D 175/04; C09D 101/02; C09D 133/08; C09D 167/02; C08K 5/07
See application file for complete search history.

(56) References Cited

U.S. PATENT DOCUMENTS 4,992,490 A * 2/1991 Childress ............. C09D 167/06
525/170

* cited by examiner

*Primary Examiner* — Robert S Walters, Jr.
(74) *Attorney, Agent, or Firm* — David J Kreher

(57) ABSTRACT

The present disclosure reveals a blending coat to be applied prior to painting a surface to improve the adhesion of a paint to the surface, improve blending of colors, keeping the surface wet which prevents shadowing or the production of a halo, and with regard to metallic paint, allows the metallic paint to lay down so that the metallic paint is even and not blotchy. The present disclosure also reveals a method of application of the blending coat.

16 Claims, No Drawings

BLENDING COAT FOR PAINT AND METHOD OF APPLICATION

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC

Not Applicable

DESCRIPTION

Field of the Invention

This invention relates to a composition for a blending coat to be applied to a surface prior to painting that improves adhesion of paint to a surface, improves the blending of colors, keeps the surface wet which prevents shadowing or the production of a halo, and with regard to metallic paint, allows the metallic paint to lay down so that the metallic paint is even and not blotchy. The invention also reveals a method of application of the blending coat.

In this application, the term "paint" will be understood to refer to pigmented oatings such as epoxies, enamels, primers, basecoats, oil-based paints, latexes, varnishes, and polyurethane finishes which are used to protect and/or beautify surfaces.

The disclosed blending coat can be used to promote (i.e. increase) the adhesion of paint to various surfaces, examples of which include metal, wood, plastic, glass, porcelain, polypropylene, ceramic, painted surfaces, and chrome.

BACKGROUND OF THE INVENTION

Compositions for the promotion or increase of adhesion of paint to a surface are known in the industry. For example, certain compositions for use in automobile finishing applications are disclosed in Childress et al. U.S. Pat. No. 4,992,490. However, for various reasons, the prior art compositions tend to have one or more disadvantages in regard to how the application can be applied, the components of the composition, or the results produced from applying the composition to the surface. For example, certain prior art compositions require extended periods for drying of the composition prior to the application of paint, or may require sanding prior to the application of paint, in order to obtain an acceptable finish.

Additionally, as local, state, and federal governments impose additional controls on the amounts of volatile organic compounds and/or combustible chemical used in any composition, the prior art compositions often must be changed to comply with the new regulations, and the changes in composition can lead to a composition that no longer produces the same quality result. Ozone generation may also be of concern for certain prior art compositions. Also, when working with some prior art compositions, the user must be concerned with the disposal of hazardous materials and the depletion of non-renewable resources. These latter two issues are becoming more important as environmental issues become more significant.

From the above, it is obvious that, for various reasons, the prior art compositions may not achieve the desired results in many situations. Therefore, there is a need in the industry for an improved product, a blending coat, which eliminates or minimizes the disadvantages or problems encountered with prior art compositions.

SUMMARY OF THE INVENTION

The present disclosure reveals a composition for a blending coat to be applied prior to painting to treat various surfaces in order to improve the adhesion of a paint to the surface, improve the blending of colors, keep the surface wet which prevents shadowing or a halo effect, and with regard to metallic paint, allows the metallic paint to lay down so that the metallic paint is even and not blotchy. Additionally, the composition of this blending coat complies with current regulations with regard to volatile organic compounds, requires less time for drying (based on being tack free), and contains reduced amounts of hazardous air pollutants. The composition of the blending coat consists of at least one polyester resin, at least one acrylic resin, cellulose formaldehyde, at least one polyurethane, and at least one urethane reducer.

The present disclosure also reveals a method of application of the blending coat comprising treating a surface with the blending coat by at least one of brushing, spraying, dipping, pouring, or rolling, followed by either the immediate application of the color coat or waiting up to 15 minutes before application of a paint.

DESCRIPTION OF THE SEVERAL VIEWS OF THE DRAWING

Not Applicable

DETAILED DESCRIPTION OF THE INVENTION

The present disclosure reveals a composition for a blending coat that is applied prior to the painting of a surface to treat the surface in order to improve the adhesion of a paint to a surface, improve the blending of colors, keep the surface wet which prevents shadowing or the creation of a halo, and with regard to metallic paint, allows the metallic paint to lay down so that the metallic paint is even and not blotchy. This composition consists of at least one polyester resin, at least one acrylic resin, cellulose, formaldehyde, at least one polyurethane, and at least one urethane reducer. The present disclosure also reveals a method of application of the blending coat.

The polyester resins are unsaturated synthetic resins formed by the reaction of dibasic organic acids and polyhydric alcohols. In particular, dibasic acids and their esterifiable derivatives (such as their anhydrides) with polyhydric alcohols.

The acrylic resins are made from alkyl acrylates and methacrylates as homo- and co-polymers, sometimes combined with other thermoplastic monomers. A preferred acrylic resin is a thermoplastic acrylic resin comprising methyl methacrylate and butyl acrylate and available under the trademark PARALOID from Kemco International Associates of St. Petersburg, Fla. Examples of acrylic resins that may be used in the composition of this invention are addition products of polyepoxides and unsaturated carboxylic acids, preferably acrylic acid and methacrylic acid. Suitable polyepoxides are epoxy novolac resing and, in particular, polyepoxides based on bisphenol A. Another suitable class of vinyl ester resins is the esterification products of alkoxylated bisphenol A and (meth) acrylic acid. Additionally, the modified acrylic resin can be a chlorinated acrylic resin which nay be modified by an acrylate monomer, such as methyl acrylate, ethyl acrylate, methyl methacrylate and methacrylate.

The cellulose is an organic compound with the formula $(C_6H_{10}O_5)_n$, a polysaccharide consisting of a linear chain of several hundred to many thousands of β(1→4) linked D-glucose units. The polyurethane is formed by reacting a polyol (an alcohol with more than two reactive hydroxyl groups per molecule) with a diisocyanate or a polymeric isocyanate in the presence of suitable catalysts and additives.

The blending coat consists of the following ingredients based on weight percentage:

| Ingredient | Amount (Weight Percentage) |
| --- | --- |
| at Least one Polyester Resin | 1.0-20.0 |
| at least one acrylic resin | 1.0-20.0 |
| cellulose | 1.0-10.0 |
| formaldehyde | 1.0-20.0 |
| at least one polyurethane | 1.0-30.0 |
| at least one urethane reducer | 1.0-40.0 |

Any deficiency in percentage would result in the inclusion of additional urethane reducer.

The method of application consists of treating a surface with two coats of the blending coat, wherein the surface is treated with the blending coat by at least one of brushing, spraying, dipping, pouring, or rolling, followed by either the immediate application of the color coat or waiting up to 15 minutes before application of a paint. The blending coat will cure with the curing of the paint, is colorless and has good adhesion properties and covers evenly.

What is claimed:

1. A blending coat consisting of:
   1.0-20.0 weight percent of at least one polyester resin;
   1.0-20.0 weight percent of at least one acrylic resin;
   1.0-10.0 weight percent of cellulose;
   1.0-20.0 weight percent of formaldehyde;
   1.0-30.0 weight percent of at least one polyurethane; and
   1.0-95.0 weight percent of at least one urethane reducer.

2. The blending coat of claim 1 wherein the at least one polyester resin is present in an amount between 5.0 and 15.0 weight percent.

3. The blending coat of claim 2 wherein the at least one acrylic resin is present in an amount between 3.0 and 15.0 weight percent.

4. The blending coat of claim 3 wherein the formaldehyde is present in an amount between 10.0 and 20.0 weight percent.

5. The blending coat of claim 2 wherein the formaldehyde is present in an amount between 10.0 and 20.0 weight percent.

6. The blending coat of claim 1 wherein the formaldehyde is present in an amount between 10.0 and 20.0 weight percent.

7. The blending coat of claim 1 wherein the at least one acrylic resin is present in an amount between 3.0 and 15.0 weight percent.

8. The blending coat of claim 7 wherein the formaldehyde is present in an amount between 10.0 and 20.0 weight percent.

9. A method of application of a blending coat to a surface, wherein said blending coat consists of:
   1.0-20.0 weight percent of at least one polyester resin;
   1.0-20.0 weight percent of at least one acrylic resin;
   1.0-10.0 weight percent of cellulose;
   1.0-20.0 weight percent of formaldehyde;
   1.0-30.0 weight percent of at least one polyurethane; and
   1.0-95.0 weight percent of at least one urethane reducer;
   wherein the surface is treated with the blending coat by at least one of brushing, spraying, dipping, pouring or rolling; and within 15 minutes after the treatment of the blending coat to the surface, applying a paint to the surface.

10. The method of application of the blending coat of claim 9 wherein the at least one polyester resin is present in an amount between 5.0 and 15.0 weight percent.

11. The method of application of the blending coat of claim 10 wherein the at least one acrylic resin is present in an amount between 3.0 and 15.0 weight percent.

12. The method of application of the blending coat of claim 11 wherein the formaldehyde is present in an amount between 10.0 and 20.0 weight percent.

13. The method of application of the blending coat of claim 10 wherein the formaldehyde is present in an amount between 10.0 and 20.0 weight percent.

14. The method of application of the blending coat of claim 9 wherein the formaldehyde is present in an amount between 10.0 and 20.0 weight percent.

15. The method of application of the blending coat of claim 9 wherein the at least one acrylic resin is present in an amount between 3.0 and 15.0 weight percent.

16. The method of application of the blending coat of claim 15 wherein the formaldehyde is present in an amount between 10.0 and 20.0 weight percent.

* * * * *